US007288765B2

(12) United States Patent
Vilain

(10) Patent No.: US 7,288,765 B2
(45) Date of Patent: Oct. 30, 2007

(54) DEVICE FOR DETECTING INFRARED RADIATION WITH BOLOMETRIC DETECTORS

(75) Inventor: Michel Vilain, Saint Georges Commiers (FR)

(73) Assignee: ULIS, Veurey Voroize (FR)

(*) Notice: Subject to any disclaimer, the term of this patent is extended or adjusted under 35 U.S.C. 154(b) by 45 days.

(21) Appl. No.: 11/191,760

(22) Filed: Jul. 28, 2005

(65) Prior Publication Data
US 2006/0060786 A1 Mar. 23, 2006

(51) Int. Cl.
G01J 5/00 (2006.01)

(52) U.S. Cl. .................................. 250/338.1
(58) Field of Classification Search .............. 250/338.1
See application file for complete search history.

(56) References Cited

U.S. PATENT DOCUMENTS

| 5,789,753 | A | * | 8/1998 | Gooch et al. ............... 250/349 |
| 5,912,464 | A | | 6/1999 | Vilain et al. |
| 6,426,539 | B1 | | 7/2002 | Vilain et al. |
| 6,583,416 | B1 | | 6/2003 | Villani |

FOREIGN PATENT DOCUMENTS

| FR | 2 752 299 A1 | 2/1998 |
| FR | 2 796 148 A1 | 1/2001 |
| FR | 2 798 994 A1 | 3/2001 |

OTHER PUBLICATIONS

Jean-Luc Tissot, et al., "LETI/LIR's Amorphous Silicon Uncooled Microbolometer Development," Proceedings of the SPIE—The International Society for Optical Engineering SPIE—International Society of Optical Engineering USA, vol. 3379, 1998 pp. 139-144.
X. Gu, et al., "On-Chip Compensation of Self-Heating Effects in Microbolometer Infrared Detector Arrays," Sensors and Actuators A 69, Elsevier Science S.A., (1998) pp. 92-96.

* cited by examiner

Primary Examiner—David Porta
Assistant Examiner—Christine Sung
(74) Attorney, Agent, or Firm—Burr & Brown

(57) ABSTRACT

This device for detecting infrared radiation comprises a one or two-dimensional array of elementary bolometric detectors, that are electrically connected to a readout circuit (1), which is associated with a compensation structure intended to divert most of the background or common-mode current that flows through each of the bolometric detectors in the array.

The compensation structure consists of a layer that incorporates at least one bolometric material (8) extending between two electrical connection areas (3, 6, 7) linked to the readout circuit (1).

The layer that incorporates the bolometric material (8) that constitutes the compensation structure is itself in thermal contact with the substrate that constitutes the readout circuit (1) outside the electrical connection areas (3, 6, 7).

7 Claims, 4 Drawing Sheets

Fig. 6
PRIOR ART
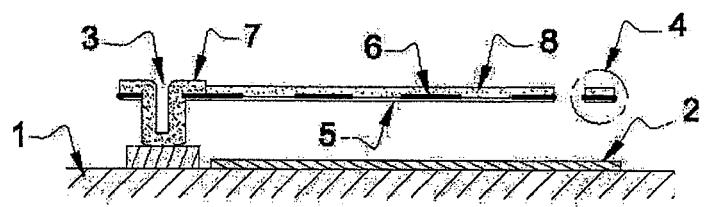
Fig. 7
PRIOR ART
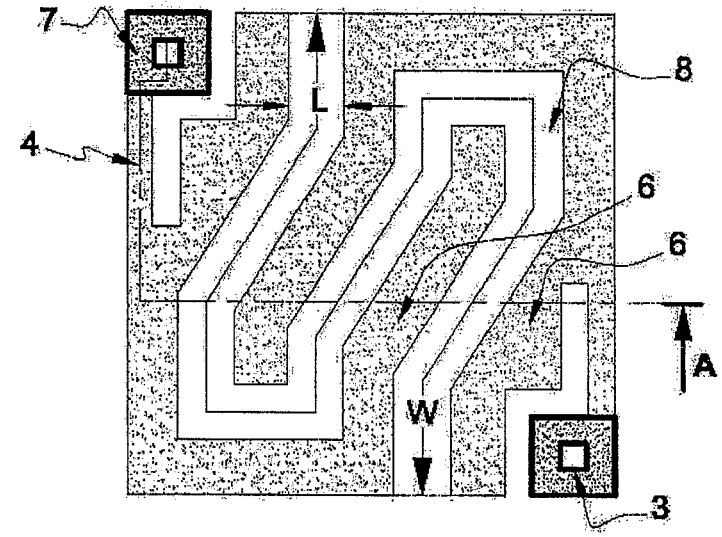
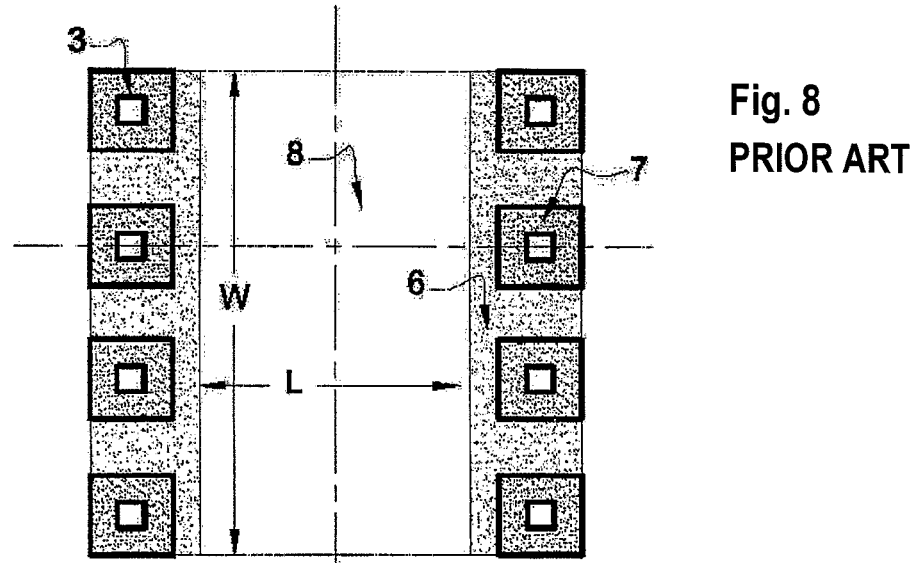
Fig. 8
PRIOR ART
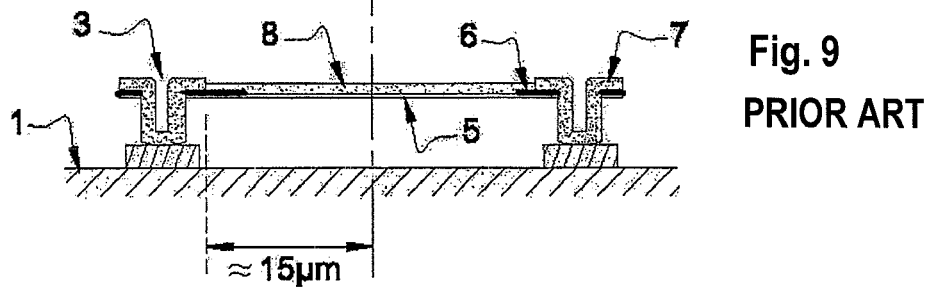
Fig. 9
PRIOR ART

DEVICE FOR DETECTING INFRARED RADIATION WITH BOLOMETRIC DETECTORS

CROSS REFERENCE TO RELATED APPLICATION

This application claims the benefit of French Application No. 04.09847, filed Sep. 16, 2004, the entirety of which is incorporated herein by reference.

FIELD OF THE INVENTION

The present invention relates to a device for detecting infrared radiation using bolometric detectors. It has applications in the field of infrared imaging in particular.

BACKGROUND OF THE INVENTION

In infrared detectors, the use of devices configured in the form of an array and capable of operating at ambient temperature, i.e. not requiring cooling to extremely low temperatures, is known—in contrast to detecting devices called "quantum detectors" which can only operate at extremely low temperature, typically that of liquid nitrogen.

These uncooled detectors traditionally use the variation in a physical unit of an appropriate material as a function of temperature at around 300 K. In the case of bolometric detectors, this physical unit is electrical resistivity.

Such an uncooled detector is generally associated with:

means of absorbing the infrared radiation and converting it into heat, means of thermally isolating the detector so that its temperature can rise due to the effect of the infrared radiation, thermometric means which, in the context of a bolometric detector, use a resistance element, and means of reading electrical signals provided by the thermometric means.

Detectors intended for infrared imaging are conventionally produced as a one- or two-dimensional array of elementary detectors, said array being "monolithic" or mounted on a substrate generally made of silicon which incorporates means of sequentially addressing the elementary detectors and means of electrical excitation and of pre-processing the electrical signals generated by these elementary detectors. These means of sequential addressing, electrical excitation and pre-processing are thus produced on the substrate and constitute a readout circuit.

Although monolithic integration of the detectors with the corresponding readout circuit is advantageous in terms of manufacturing costs, it is nevertheless possible to hybridise an array of detectors on such a readout circuit.

The device comprising such an array of elementary detectors and an associated readout circuit is generally placed in a hermetically sealed package and is electrically and thermally connected to its external environment using classic technologies. The pressure inside such a package is reduced in order to limit the thermal losses of the picture elements (pixels) into the substrate. The package also has a window that is transparent to the radiation to be detected, in this case infrared radiation.

In order to capture a scene using this detector, the scene is projected through suitable optics onto the array of elementary detectors and clocked electrical stimuli are applied via the readout circuit to each of the elementary detectors or to each row of such detectors in order to obtain an electrical signal that constitutes an image of the temperature reached by each of said elementary detectors. This signal is then processed to a greater or lesser extent by the readout circuit and then, if applicable, by an electronic device outside the package in order to generate the thermal image of the observed scene.

The essential difficulty of using bolometric detectors is the extremely small relative variation in their electrical resistivity that is representative of the local temperature variations of an observed scene compared with the average value of these resistances. In fact, the physical laws of thermal emission in the infrared spectrum of the observed scene from 8 to 14 µm (equivalent to transparency band of the terrestrial atmosphere in which bolometric detectors are usually used) result in a differential power dP on the detector's focal plane of the order of 50 µW/cm$^2$ when the temperature of the scene varies 1 K either side of 300 K. Determining this value is easily within the capabilities of those skilled in the art by applying the above-mentioned physical laws.

This estimate is valid for an f/1 optics, good transmission between the scene and detector and if the detector only receives a negligible amount of energy outside the specified wavelength band, for example and typically if the package has a window that is transparent in this range and opaque below and beyond the stated limits.

Consequently, the variation in temperature dT of a bolometer working at thermal equilibrium associated with an infrared power dP absorbed on its surface S is given by the following equation:

$$dT = Rth \cdot dP,$$

where Rth is the thermal resistance between the sensitive part of the bolometer, the temperature of which rises due to the infrared radiation, and the isothermal substrate on which it is mounted, the temperature of which is constant or varies only very slowly.

Thus, for a bolometer of typical dimensions of the order of 30 µm×30 µm which represents a surface area of $9.10^{-4}$ cm$^2$, the typical thermal resistance is of the order of 10 to 30 MK/W which results in an increase in the temperature of the bolometer of the order of 0.005 K to 0.015 K if the element of the scene observed by the bolometer varies by 1 K.

The resulting variation in resistance dR is expressed by the following equation:

$$dR = TCR \cdot dT$$

where TCR is the relative coefficient of variation in resistance of the material that constitutes the sensitive part of the bolometer at around its operating temperature. For the usual materials in this field (vanadium oxides, amorphous silicon), this coefficient TCR is approximately 2% per K. In other words, the relative variation in resistance dR/R resulting from a difference of 1 K over the scene is therefore of the order of 0.02% where R is the electrical resistance across the two current input terminals on the sensitive bolometric material.

Nowadays, thermal imaging resolutions much better than 1 K, typically 0.05 K or even less are required. Such results can be obtained by producing structures that have very high thermal resistances Rth by using sophisticated techniques. However, there remains the need to measure minute relative variations in resistance, typically—as stated earlier—of the order of $10^{-5}$ in order to resolve temperature variations in time and space of just a few dozen millikelvins.

In order to explain the difficulty of analysing such a small variation, FIG. 1 shows a schematic view of simple hypothetical means of making repeated measurements, i.e. sampling an electrical resistance Rb, e.g. in a bolometric material. To achieve this, a bias voltage Vb is applied across the terminals of resistor Rb at a specific instant. The resulting current through Rb is integrated for a period Tint called the "integration time" in a capacitor Cint. The voltage Vs on the output of this integrator, an image of resistance Rb, is given by the equation:

$$Vs=(Vb/Rb)\cdot Tint/C$$

assuming, for the sake of simplicity, that Rb varies little throughout integration period Tint.

At the end of the integration period, voltage Vs is used as a wanted imaging signal and then reset to zero by a reset switch RAZ before the next readout operation of Rb starts.

Thus, an array of N resistors (bolometers) can be read using this principle with the aid of simultaneous integration (by means of N integrators) or sequential integration (in an integrator at the end of a line or end of a column or even a single integrator for the array). If the array thus produced is illuminated by projecting an infrared scene, Vs will provide variations in space (obtained from each bolometer) representative of the scene. The reader is reminded that voltage Vs as stated previously consists largely of a component that is constant from one detector to the other (a signal called a common-mode signal) which therefore has no relevance in terms of imaging. Only the minute variations in Vs associated with local differences (from one bolometer to another) and variations in time (the scene varies as time passes) in the received radiant flux constitute the wanted signal for the observed scene.

The constraints inherent in microelectronic circuits in terms of voltage (only several volts), the values of bolometric resistance Rb that can be accessed and controlled (several dozen to several hundred kOhms) and the need to use integration periods sufficient to limit the integration time would result in the need to use capacitances Cint having extremely large values that would be incompatible with the surface area available on each detection picture element or pixel (of the order of the surface area of one bolometer) and, in practice, even incompatible with mounting this capacitor towards the edge or on the edge of the readout circuit where the surface area is not confined to that of the picture element. There is therefore a need to establish methods of reading that limit the current that is to be integrated to levels that are compatible with capacitances that can reasonably be implemented.

A known solution such as that described in the document entitled "LETI/LIR's amorphous silicon uncooled microbolometer development"—Infrared Detectors and Focal Plane Arrays V, 14-17/04/98, SPIE ORLANDO, SPIE Proceedings Vol. 3379 is shown schematically in FIG. 2.

This solution involves diverting most of the background or common-mode current (independent of illumination) flowing through each bolometer in the array through a special structure called a "compensation resistor" having a value Rc and ideally insensitive to illumination. This compensation resistor is located at the end of a column or the end of a line of the array, one of its terminals is biased by voltage Vc which is negative relative to the input potential of the integrator and the other terminal is connected to the input of the integrator.

Usually, an addressing device (not shown in order not to introduce unnecessary detail in FIG. 2) successively applies the current of each bolometer in the same column or same row to the input of the integrator. Voltage Vs on the output of the integrator at the end of integration is then expressed by the quotient:

$$Vs=(Vb/Rb-Vc/Rc)\cdot Tint/C.$$

Current Vc/Rc is trimmed by adjusting voltage Vc and by the design choice to make Rc close to the average value (on the array) of Vb/Rb under normal operating conditions. In this way the level that is common to all the pixels, regardless of illumination, is eliminated from output signal Vs. This being so, the dynamic range of the integrator (Vs max.–Vs min.) can substantially be devoted to representing variations in resistances Rb in space and time, i.e. the temperature of each scene element.

Another solution also intended to substantially limit the common level has also been suggested, for example in the document entitled "On-chip compensation of self-heating effects in microbolometer infrared detector arrays"—Sensors and Actuators A 69 (1998) 92-96. This option involves using a resistance bridge that includes the bolometer in one of its legs and a compensation resistor, ideally insensitive to illumination, in its other leg as shown schematically in FIG. 3.

As in the previous solution, a compensation resistor is placed at the end of each column or each row and a switch system (not shown) successively connects each bolometer in the same column or same row to the resistance bridge. The unbalancing of the bridge produced by the rise in the temperature of bolometer Rb due to the effect of infrared illumination by the scene is applied to the column or row amplifier as a differential input.

These compensation resistors may be formed in the readout circuit—this gives them natural insensitivity to infrared illumination. Advantageously, regardless whether they are used for current subtraction or in a bridge configuration, they are made of the same material as the bolometric resistors in the array and preferably obtained simultaneously (i.e. during the same technology operation) so that the dR/RdT relative temperature variation characteristics of resistors Rb and Rc are as similar as possible and ideally identical. This arrangement makes it possible to compensate overall variations in the temperature of the readout circuit by constructional means because the active imaging element Rb and the compensation element Rc both have the same temperature coefficient TCR in this case and therefore vary together in the same direction and with the same relative variation when the temperature of the readout circuit fluctuates either side of its quiescent point.

The compensation element, with this advantageous method of construction using the same material, is typically placed at the end of a column or end of a row so as to limit the surface area of the pixel. The construction of this element in the pixel of the detector would imply a surface area set aside for this structure and therefore an ultimately larger pixel or, for a given surface area, using part of this surface area in order to insert the compensation element, this resulting in a loss of performance of active element Rb. However, the surface area of the detector is always crucial from an economic viewpoint in microelectronics, especially for imaging components and more especially for infrared imaging where the cost of optics relative to the surface area of the focal plane has a paramount impact on the final cost of the system.

This being so, optimising the structure of the compensation surface usually demands a non-negligible surface area beyond the optically active surface area and this has an economic impact on the number of detectors that can be produced collectively on the same substrate.

In addition, in order to use the above-mentioned advantageous layouts under conditions that are technically acceptable, the compensation structures and detection structures (actual bolometers) must be produced simultaneously, namely by the construction of suspended membranes obtained by thin-film deposition. One unavoidable consequence of this fabrication technology is that these compensation structures have a certain degree of thermal isolation that is not zero relative to the substrate that forms the readout circuit despite any design precautions that might be taken in order to minimise such thermal isolation. Even if they are located away from the optically active surface (compensation relocated to end of column or end of row), these structures are usually illuminated by the optics in the same way as the active array of bolometers. In fact, it is impossible to position them very far away for economic reasons: the substrate surface area this takes up, which defines the number of detectors per unit of substrate, and the size of the package in which the detection device has to be integrated. This results in variation in space and time during operation of resistors Rc (of compensation current) which degrades image quality and limits the performance of the component, especially in the event of strong local illumination of the compensation structures.

Also, the current that flows through these compensation structures tends to heat them because their thermal resistance, even though low, is not zero. The increase in temperature $\Delta T$ of a bolometer as a function of time during integration interval 0<t<Tint is given in a simplified but representative manner by the expression:

$$\Delta T \# (Vb^2/Rb) \cdot Rthb(1-\exp(-t/Rthb \cdot Cthb))).$$

where:

$Vb^2/Rb$ is the electric power developed through the bolometer during integration;

Rthb and Cthb are the resistance and heat capacity of the bolometer respectively;

the product Rthb·Cthb represents the time constant for return to equilibrium temperature in the absence of biasing (typically several milliseconds, i.e. much longer than the usual integration time of several microseconds).

As a result, the increase in temperature of the bolometer at the end of integration due to the effect of the readout current is given approximately by the expression:

$$\Delta Tb \# (Vb^2/Rb) \cdot Tint/Cthb$$

which does not depend on the thermal resistance of the bolometer but rather on its heat capacity.

An equivalent relation is obtained for compensation resistance Rc:

$$\Delta Tc \# (Vc^2/Rc) \cdot Tint/Cthc$$

in the general case where the time constant Rthc. Cthc of the compensation resistor is equally large compared with Tint.

If $\Delta Tb$ differs from $\Delta Tc$, this difference causes a differential current that is independent of illumination of the active element and therefore an unwanted integrated signal that would dramatically reduce the dynamic temperature range of the scene of the readout circuit. In fact, the electric readout power is much higher than the infrared power to be detected: usually, the readout temperature increase is 0.5 to several degrees, i.e. the variation in the resistance Rb is easily of the order of several % compared with 0.001% which is equivalent to the variation in the temperature of the scene of several dozen millikelvins as evaluated earlier. As a result, it is crucial to eliminate most of the differential current associated with electric heating.

In the case of integration as disclosed in the above-mentioned LETI publication, this differential readout temperature increase is not a problem because it is sufficient to slightly modify one of the voltages Vb or Vc in order to compensate the additional temperature-rise current differences.

The second document cited discloses that differential integration using a resistance bridge makes it possible, if $\Delta Tb\#\Delta Tc$, which implies Rc#Rb and Cthc#Cthb (since Vb=Vc in a balanced bridge circuit), to compensate not only the common-mode current but also the additional current associated with electric heating of the bolometer during the integration period.

For an array of n rows, the resistors Rc placed at the end of columns are excited n times more often than a bolometer in the array. Because of this they must have a return-to-equilibrium time that is sufficiently short to return to roughly the temperature of the substrate between two consecutive integration periods (the time to read one complete row). Since Cthc is set in the vicinity of Cthb, it follows that Rthc must therefore be relatively small. However, in order for the temperature rise of the active and compensation structures to remain comparable, Rthc cannot be very small. Finally, in the case of reading using a resistance bridge, the optical sensitivity of the detector at the level of the compensation structures cannot therefore be negligible.

FIGS. 4 and 5 schematically show a configuration in accordance with the first of the cited document according to the prior art. FIGS. 4 and 5 show an array of n rows and m columns of bolometric detectors identified by their respective coordinates as a function of their position.

The "active" surface includes all the resistors Rb made of a bolometric material and positioned in m rows and n columns. An example of such a detector is described in detail for example in relation to FIGS. 6 and 7.

Consequently, the compensation used in this example, located at the end of the column, comprises c rows and m columns (cf. FIG. 4). However, it is conceivable, as shown in FIG. 5, to use compensation areas at the end of each of the columns of the "active" detection area no longer consisting of differentiated elementary surfaces but of elongated column-shaped areas. The essential point is the effective, available compensation surface area for each of the columns in the "active" detection area. In contrast, each of the compensation columns is well differentiated from the adjacent columns.

An example of compensation areas in accordance with the prior art are shown in FIGS. 8 and 9.

In order to overcome the structural drawback associated with the non-negligible optical sensitivity of the detector at the level of the compensation structures, it has been proposed to insert an opaque screen between the active detection array and the compensation structures, typically inside the package in order to remain close to the focal plane, thereby limiting the shadowing effect on these structures. Such a screen is, for example, fitted in the space shown in FIGS. 4 and 5 by the broken line.

However, this solution has a considerable economic impact: fabrication is more complex, more accurate assembly is required, cost in terms of surface area of microelectronic circuitry and the volume of the package.

Another limitation of the technique described is the electrical noise added by the compensation structure. In fact, the materials usually used for microbolometry, especially amorphous materials, exhibit low-frequency noise at 1/f (f for frequency) which largely determines the performance of detectors. Experience shows that the current noise power relative to the actual current (Vb/Rb) is proportional to $1/v_b^{1/2}$ where $v_b$ is the active volume of the bolometric material. The active volume relates to the volume of the bolometric materials through which the current lines effectively pass during operation of the structures. This relation applies to active bolometer's (Rb) and to the compensation element (Rc) because the latter is made of the same material and substantially the same current flows through it. The resulting overall noise on signal Vs is then proportional to:

$$((1/v_b)+(1/v_c))^{1/2}$$

where $v_b$ and $v_c$ are the active volumes of elements Rb and Rc respectively. It is apparent that one should maximise the volume of element Rc in order not to add excessive low-frequency noise to that which bolometer Rb would produce on its own.

In practice, the degraded performance inherently due to additional noise associated with element Rc is negligible if $v_c$ is at least ten times greater than $v_b$. Since it is preferable to obtain the active and compensation structures during a single technology operation, the thickness of the bolometric material is structurally identical in both these types of structure and, consequently, it is the active surface (affected by the current lines) of elements Rc which must be ten times larger than that of elements Rb. This means that it would be advisable to typically add the equivalent of ten extra rows (for a compensation structure positioned at the end of a column) at the edge of the imaging array in order to accommodate compensation structures there. This overall-size constraint may not be very significant for arrays with a large number of points or pixels but needs to be taken into consideration in terms of the number of products per substrate in the case of detectors with a smaller surface area.

It must be emphasised that using large-area compensation structures, as recommended, implies that Cthc is much greater than Cthb and that the temperature rise during the readout pulse is much smaller. It was stated earlier that although this condition is not overriding in the context of the technical solution proposed in the LETI publication cited earlier, in contrast, in the context of using a bridge connection as described in the other publication mentioned ("On-chip compensation of self-heating effects in microbolometer infrared detector arrays"), it is crucial that Cthc#Cthb, in other words, the compensation structure must, in this case, necessarily have a volume $v_c$ close to the volume $v_b$ of the active element (since $v_c$ and Cthc are closely linked) and, consequently, it is impossible to minimise the noise added by compensation.

SUMMARY OF THE INVENTION

The present invention relates to a detection device that uses compensation structures with practically nil residual sensitivity, thereby making it pointless to integrate opaque screens in the package and significantly limiting the space devoted to these structures despite a negligible added noise level.

This infrared detection device comprises an array of bolometric detectors electrically connected to a readout circuit, the array being associated with a compensation structure intended to divert most of the background or common-mode current that flows through each of the bolometric detectors in the array.

According to the invention, the compensation structure consists of a simple or complex layer comprising at least one bolometric material extending between two electrical connection areas linked to the readout circuit, said layer incorporating the bolometric material that constitutes the compensation structure itself being in thermal contact with the substrate that constitutes the readout circuit outside the electrical connection areas.

This results in high thermal conductivity compared with techniques of the prior art and makes it possible to make the transfer of heat between the bolometric material that constitutes the compensation structure and the readout circuit uniform. Doing this substantially eliminates the shortcomings inherent in optical heating of the component elements of said compensation structure.

According to one feature of the invention, the material that constitutes the compensation structure is identical to the bolometric material that constitutes the bolometers that ensure active detection and are part of the detection array.

These compensation structures are located at the end of the rows or the end of the columns of the array of detectors.

According to one embodiment of the invention, the layer that incorporates the bolometric material that constitutes the compensation structures has corrugations in a vertical plane, said corrugations extending parallel to the rows or columns of the detection array, all or some of the lower ends of the corrugations coming into thermal contact with the substrate that constitutes the readout circuit.

According to another embodiment of the invention, the layer that incorporates the bolometric material that constitutes the compensation structure has a certain number of pits or posts, the lower end of which is in thermal contact with the substrate that constitutes the readout circuit.

BRIEF DESCRIPTION OF THE DRAWINGS

The method of implementing the invention and its resulting advantages will become apparent from the following embodiment, described merely by way of example, reference being made to the accompanying drawings in which:

FIG. 6 schematically shows a bolometric detector in accordance with the prior art, FIG. 7 being a cross-sectional view along line AA.

FIG. 8 schematically shows a component element of a compensation structure in accordance with the prior art, FIG. 9 being a cross-sectional view along line BB.

DETAILED DESCRIPTION OF THE INVENTION

The purpose of FIG. 6 is to show a traditional bolometric detector in order to clearly demonstrate the differences to a component element of a compensation structure in the sense of the present invention.

Figure 1:
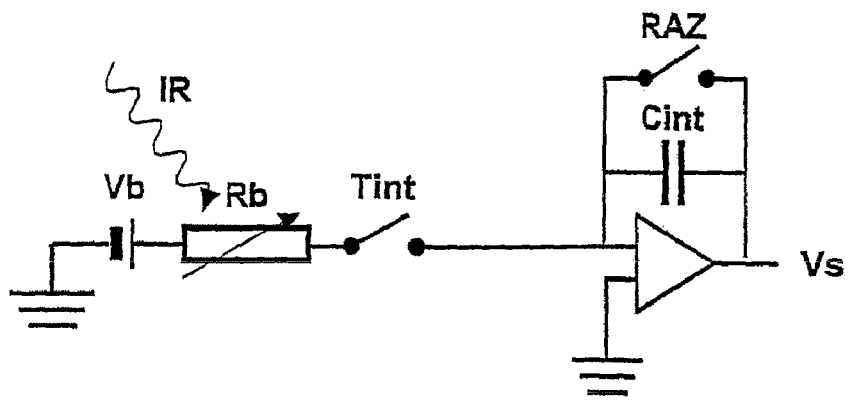
FIG. 1 schematically shows the simplified sampling circuit of a bolometric detector in accordance with the prior art.
Figure 2:
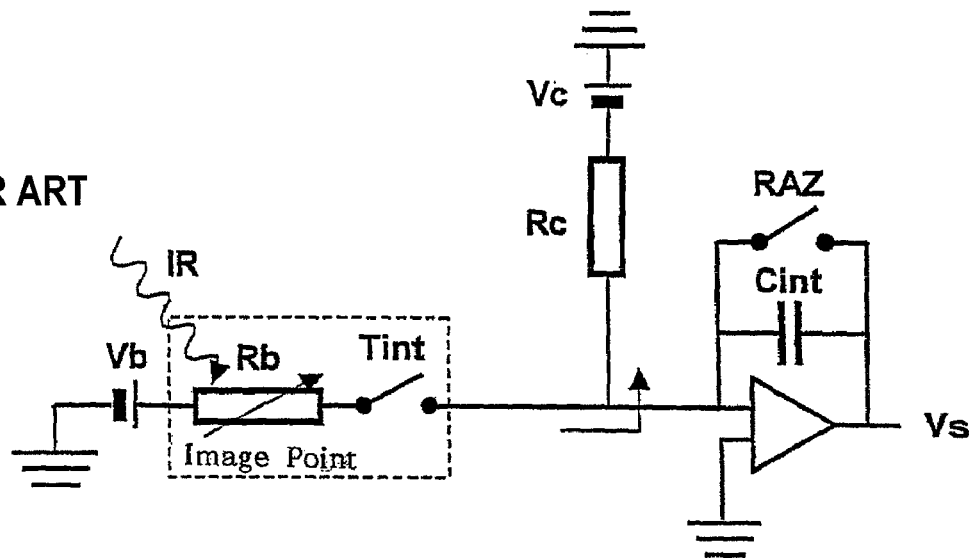
FIG. 2 schematically shows the simplified electrical circuit of a method of common-mode compensation according to an embodiment of the prior art.
Figure 3:
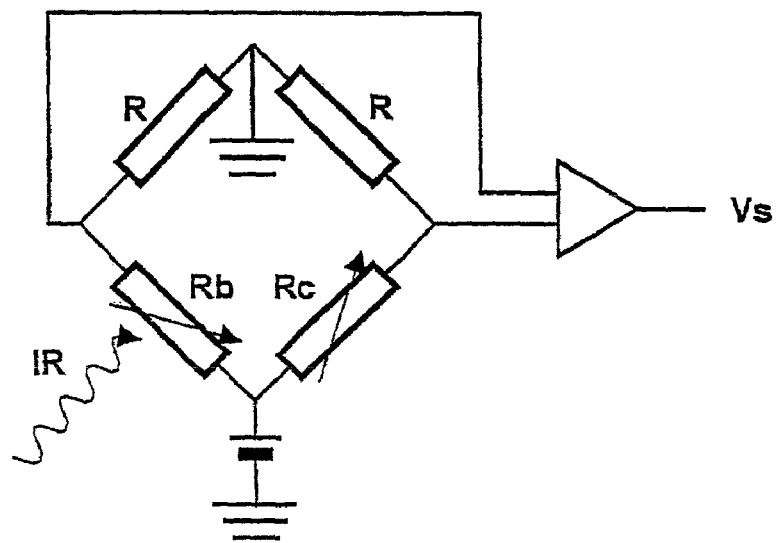
FIG. 3 is a similar view to FIG. 2 of another embodiment of the prior art.
Figure 4:
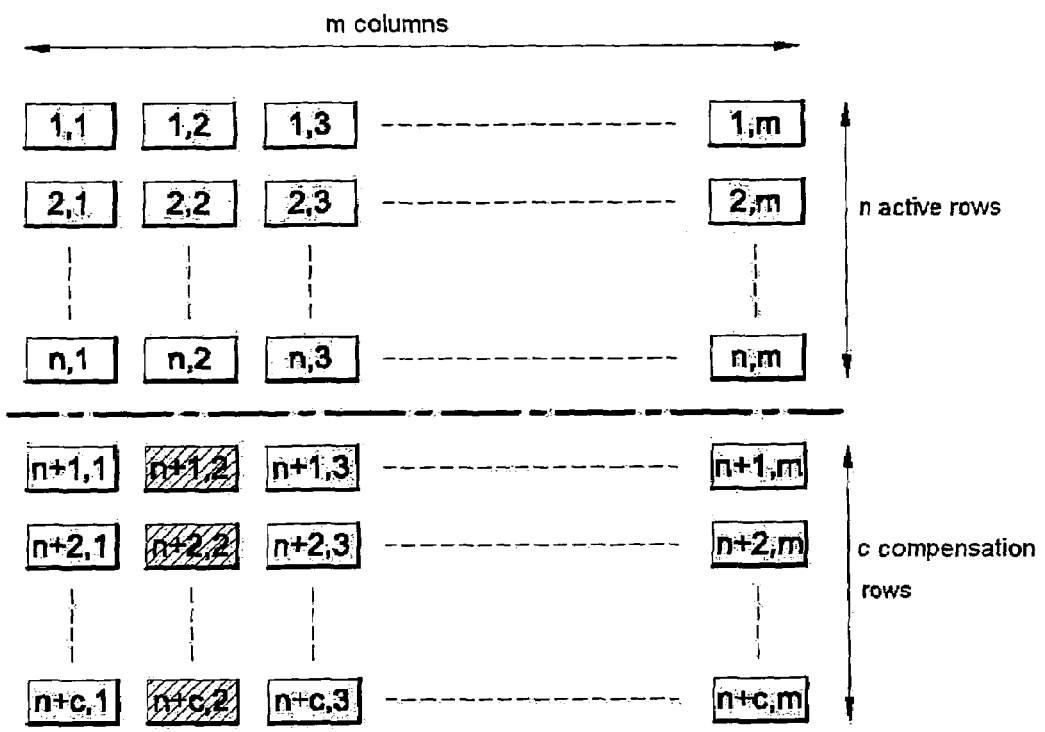
FIG. 4 schematically shows an array of bolometric detectors of n rows and m columns, showing the general compensation principle, in this case at the end of columns, FIG. 5 being a similar view of a slightly different embodiment.
Figure 5:
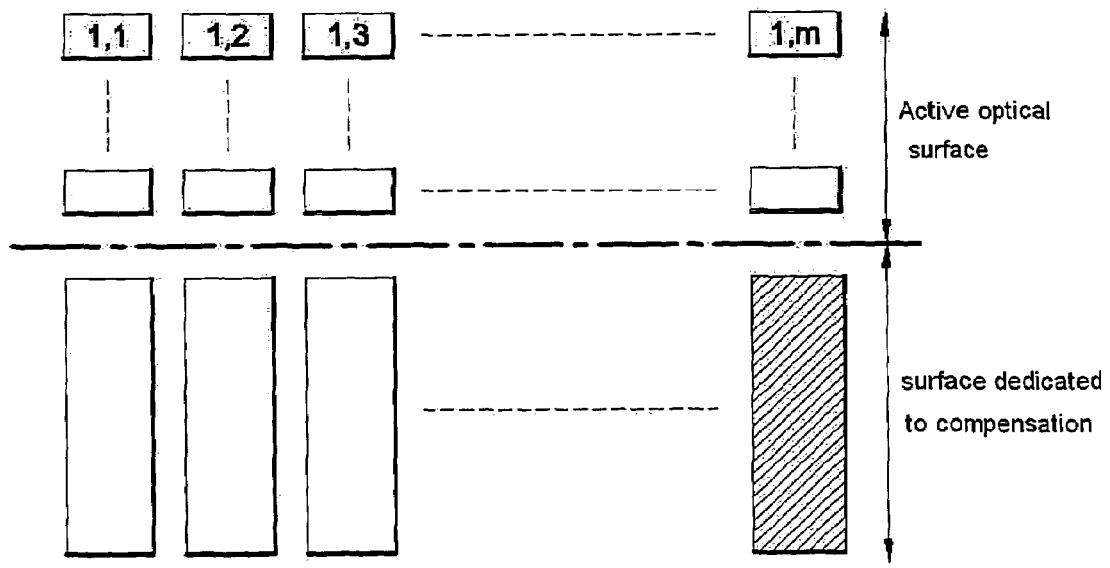

This active detector, equivalent to resistor Rb in the circuit diagrams in FIGS. 1 to 3, is of the type described, for example, in document FR-A-2,752,299. Although the illustration taken from it has been extremely simplified, it is nevertheless understood that this embodiment cannot in any way reduce the scope of the invention and that, in particular, it is deemed to cover every type of bolometric detector such as those described, for example, in the information disclosed by document FR-A-2,796,148.

In the rest of this description, the same reference number will identify identical components or components of the same functional nature whenever this applies.

In FIG. 6, the reference (1) represents the silicon substrate on which the readout circuit is produced. This substrate (1) is traditionally covered, at the level of the active structures (Rb), i.e. straight below the areas consisting of bolometric material, with a reflective metallic layer (2). The latter is intended, in a known manner, to reflect the radiation not absorbed by the bolometric material itself and located approximately 1.5 to 2.5 µm above the reflector (2) at the level of said bolometric material. The distances stated above take into account desired optimisation of detection for radiation having a wavelength of around 10 µm.

The bolometric material is therefore suspended above the readout circuit by means of essentially vertical structures (3) that conduct electricity. These structures are produced with the aid of a metallic material (7) and are also intended to apply the excitation potentials generated by the readout circuit to the conducting parts (6), also called electrodes, of the bolometric detector via elongated structures (4) that also conduct electricity but are thermally resistive.

This thermal resistance, also referred to as "thermal isolation" is intended to allow an increase in the temperature of the bolometer due to the effect of the infrared radiation that is to be detected.

The readout circuit applies, via elements (3) and (4) and via at least two conducting parts (6), an electric current that flows through the structure parallel to the plane of the bolometric detector. This current flows through a material (8), the resistivity of which varies with temperature and which is referred to as a bolometric material.

The most widely used materials for this purpose are vanadium oxide (generic formula VOx) and amorphous silicon (a-Si).

The electrodes (6) are produced with the aid of a fine, usually metallic, conducting layer. In the example described, the electrodes (6) are arranged on the lower surface of the bolometric material (8). They may also be involved in absorption of the infrared radiation The particular embodiment of this bolometric detector is by no means limitative. The shape of the electrodes (6) and of parts (3) and (4) can be very different. In particular, the pattern of the electrodes (6) is selected so that the preferred value of electrical resistance Rb can be obtained between the two electrical terminals (3) of the device.

The electrodes (6) and bolometric material (8) are supported on an isolating layer (dielectric) (5), typically made of silicon oxide or silicon nitride. This layer is optional but facilitates assembly of the structure according to the invention.

Electrical resistance Rb is essentially defined by the resistance obtained between the two electrodes (6) and is itself proportional to the ratio L/W where L and W denote the electrical length and width respectively of the active surface of the bolometric material (8).

FIG. 8 shows a component of a compensation structure of a known type. As illustrated, this compensation element Rc is assumed to have been produced at the same time as active detection element Rb in FIG. 6. Because of this simultaneous production process, i.e. production during the same technology operation, the relative temperature variation characteristics dR/RdT of resistors Rb and Rc are as close as possible and even identical.

At the level of this compensation element Rc, the substrate (1) is preferably not covered with a reflecting material in order to limit infrared absorption in the suspended membrane made of a bolometric material (8). Thermal resistance is typically minimised by providing several substantially metallic supporting and electrical contact structures (3) either side of resistor Rc formed between the two electrodes (6) by said bolometric material (8). The thermal resistance of such a structure, although low, is sufficient to produce a slight temperature rise in the central part, especially when exposed to strong illumination. This temperature increase is sufficient to disrupt the electrical compensation function of sensitive bolometer Rb. The shorter the distance L, the more marked the temperature rise becomes because the surface covered by electrodes (6) absorbs infrared radiation due to its construction. One can adjust, by construction, resistance Rc (typically to a value close to Rb) by altering the distance L between the two electrodes (6). One can also adjust resistance Rc by altering width W but, in this dimension, the ratio between the incident infrared power (proportional to the surface area of the structure) and the thermal resistance (inversely proportional to W) is constant and, as a result, "optical" heating is constant.

In the general case where at least one of the other materials that constitute the suspended membrane absorbs infrared radiation, such as silicon oxide, for example, and more particularly silicon nitride which is very widely used in this type of device, the internal part of the membrane absorbs radiation over its entire surface area and there is no means of limiting "optical" heating at the level of the design of the electrodes.

Usually, the structure corresponding to FIG. 8 must be repeated at least five to ten times with, for example, parallel or serial-parallel connections in order to obtain a total resistance Rc that is comparable to Rb as the preceding explanations demand and, in addition, in order to make only a negligible contribution to the compensated total readout noise of bolometer Rb.

It is also possible to elongate the structure described in relation to FIG. 8 in the direction of unit W (electrical width) with the same result as electrically assembling several separate identical compensation elements in parallel as shown in FIG. 6, without changing any of the foregoing arguments.

However, it has already been demonstrated that, in either case, multiplying the number of these compensation structures uses up a lot of substrate surface area and therefore increases production costs in terms of the number of elementary detectors per substrate and the reduced efficiency associated with the surface area and, in every case, the optical response of the compensation structures is not zero.

Figure 10:
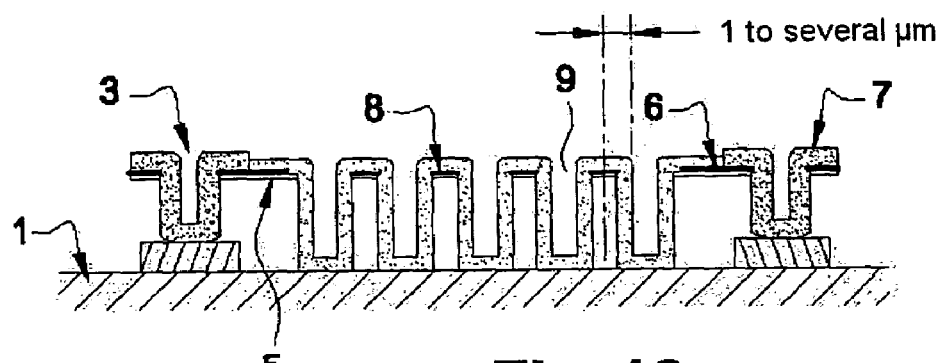
FIG. 10 being a cross-sectional view of one of these embodiments along line AA.
Figure 11:
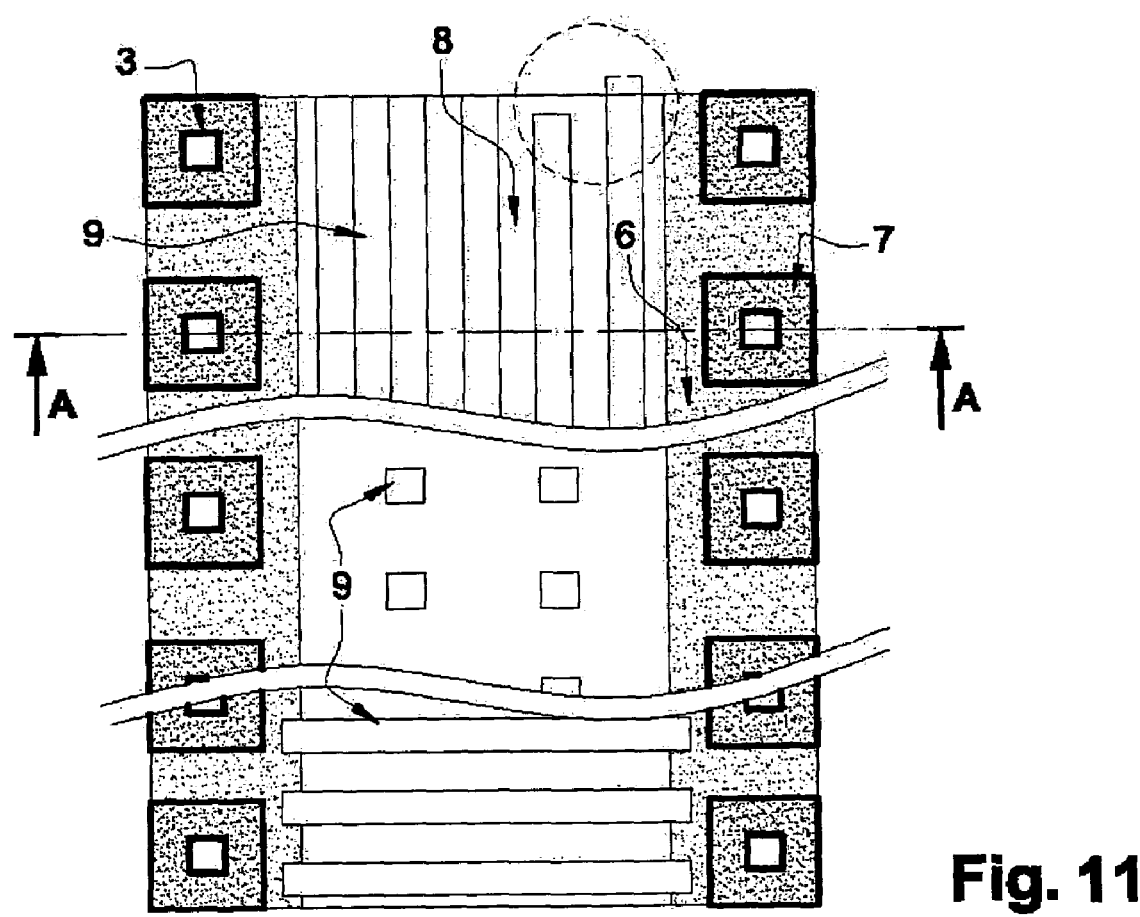
FIG. 11 schematically shows a component element of a compensation structure in accordance with the present invention in three possible configurations.

The invention therefore proposes to use a compensation structure of the type described in relation to FIGS. 10 and 11.

FIG. 10 explains the structure of compensation elements Rc in relation to the active elements adopting a simultaneous production process. The active elements are typically not modified.

FIG. 11 is split into three areas in an attempt to represent a particular embodiment of the structure according to the invention in each of them produced using the same principle and the same implementation technique.

According to the invention, the major distinctive feature is the fact that the central part of the compensation element, between the electrically conductive structures (3), has extensions (9) extending towards the readout circuit far enough to come into thermal contact with the latter. This results in high thermal conductance compared with the prior art between said substrate, the temperature of which is constant or varies very slowly, and the membrane that constitutes compensation resistance Rc, thus drastically reducing the optical response of the compensation structure and, consequently, improving the quality of the images obtained using the bolometric detector.

In particular and as shown in FIGS. 10 and 11, these thermal contacts (9) are evenly distributed over the surface of the compensation element so as to make sure that heat transfer between the membrane and the readout circuit (1) is uniform in order to obtain maximum conduction of heat for a minimum thermal contact (9) surface area.

In addition, in a particular embodiment of the invention, these thermal contacts consist entirely of the actual bolometric material (8). This is advantageous for at least two reasons:

firstly, the bolometric material usually constitutes the bulk of the material that constitutes the membrane; it is therefore preferable to use this material to make the thermal contacts in order to obtain good "vertical" conduction of heat;

secondly, this arrangement makes it possible, depending on the characteristics of the deposited bolometric material, to use the geometry of these thermal contacts to define resistance Rc and also, therefore, the electrical noise generated by this resistance because this noise is defined by the volume of the active material: it is an advantage to use a maximum active volume over a minimum surface area (projected onto the readout circuit).

The top part of FIG. 11 shows the case where the thermal contacts (9) result from a plurality of corrugations in the active area of the compensation element running parallel to the edge of electrodes (6). This configuration makes it possible to increase the resistance Rc seen between these electrodes for a constant projected area whilst very significantly reducing thermal resistance and electrical noise.

The middle part of FIG. 11 shows the case where the thermal contacts (9) are in the shape of posts or pits. In the example described, these posts or pits are square shaped but any other shape is feasible. This configuration, referred to as "point-shaped", makes it possible to reduce thermal resistance significantly without substantially modifying resistance Rc or electrical noise. The dimensions of the pits can be selected so that the cavity that they define is completely filled with bolometric material. In this way one obtains solid posts that afford the same advantages as the previous configuration whilst limiting, as much as possible, the area of (flat) active membrane that is taken up.

The bottom part of FIG. 11 represents the case where the thermal contacts (9) are the result of a plurality of corrugations in the active area of the compensation element and are perpendicular to the edge of the electrodes (6). In other words, said corrugations extend at right angles relative to the electrical connection areas (3, 6, 7) of said structures on the readout circuit (1). This configuration makes it possible to reduce the resistance Rc seen between these electrodes with a constant projected area whilst very significantly reducing the thermal resistance and electrical noise.

Using structures produced in the configuration called "point-shaped" (posts or pits) makes it possible to substantially eliminate the shortcomings of previous techniques in terms of optical heating of compensation elements and, consequently, allows significant improvement of the detection performance of the device with which such compensation structures are associated.

The use of structures produced in the configurations called "linear" (corrugations) makes it possible to reduce the surface area on the readout circuit taken up for constant electrical noise or to reduce electrical compensation noise for a constant utilised surface area with substantial elimination of the shortcomings of prior techniques in terms of optical heating of the compensation elements with the same consequence as that mentioned above.

One embodiment of the invention is described below. This embodiment is merely by way of example and does not limit the effective scope of the invention to the extent that alternative designs in terms of geometry or assemblies of various layers can be envisaged in order to implement the underlying principle of the invention as previously described.

The readout circuit (1) or substrate that includes appropriate electronic addressing and integration functions is, as already explained, traditionally covered with a material that reflects infrared radiation, typically metallic, for example a 0.03 to 1 μm thick layer of aluminium, preferably only opposite the active structures (bolometers) (cf. FIG. 6). This layer is defined in accordance with a first "lithographic level" to use the technical term and selective etching on the passivation of the substrate using conventional techniques.

A so-called "sacrificial layer" of material that is intended to be removed at the end of the process is deposited using a technique that is well known to those skilled in the art on top of the covered readout circuit. This sacrificial material typically consists of polyimide for example and has a thickness of 1.5 to 2.5 μm. This thickness range is intended to produce a preferential absorption effect in the transparency band of the terrestrial atmosphere with a 8 to 14 μm wavelength.

Optionally but usefully for the remainder of the production process, a layer of dielectric material (5) is deposited on the surface of the sacrificial material. This dielectric material typically consists of silicon oxide or silicon nitride and has a thickness of the order of 0.01 to 0.5 μm.

A metallic layer (6) having a sheet resistance of the order of 200 Ω/square is then deposited over the entire layer (5). This layer is intended to optimise the absorption of infrared radiation. It usually consists of titanium or titanium nitride. The term "sheet resistance" is well known to those skilled in the art and conventionally denotes the resistance of a strip, the width of which equals its length and is therefore equivalent to a square.

A second lithographic mask is used to etch the two layers (6) and (5) and the entire thickness of the sacrificial layer in accordance with the substantially vertical parts (3) using dry etching techniques down to the superficial parts of the substrate (typically the electrical inputs of the readout circuit). Layer (6) can be deposited after this operation if this makes it possible to produce contact of sufficient quality with the inputs of the readout circuit at the bottom of the vertical parts (3).

A metallic material (7) is then deposited on the surface and produces posts that form the electrical interface between layer (6) and the inputs of the readout circuit. This material is defined selectively on layer (6) by using a third lithographic level defining the small surfaces that protrude from parts (3). Material (7) which may comprise several different layers is a material selected from those that are traditional for this purpose in microelectronics: aluminium, titanium, titanium nitride, tungsten, etc. Typically, there may be a high density of posts (3) either side of the compensation structures so as to ultimately obtain structures with low thermal resistance although this density must be as low as possible in the area of the active structures earmarked for detection because they are useless for detection purposes.

A fourth lithographic level is applied in order to define the electrodes (6) in material (6) using, for example, the technology described in above-cited LETI document.

A fifth lithographic level is applied in order to define the thermal contacts (9). Layer (5), if there is one and the entire thickness of the sacrificial material are etched substantially vertically down to the surface of substrate (1) by using known techniques. It is here that layer (5) has its purpose as a secondary mask for etching the sacrificial layer. Typically, the thermal contacts (9) are not supported by the surfaces covered by layer (6), although this possibility is not excluded, as shown locally in the bottom part of FIG. 10.

The bolometric material (8), typically amorphous silicon or a similar alloy having a generic formula $Si_xGe_yC_{(1-x-y)}$ is then deposited on this assembly to a thickness of typically 0.05 to 1 µm. Other temperature-sensitive materials can be used. This material locally forms, at the level of contacts (9), a direct thermal bridge between the surface of substrate (1) and the membrane level (all the various layers deposited on the surface of the sacrificial material).

The properties of the material deposited on structures (9) have an influence on the result in terms of the effectiveness with which the invention is implemented. Materials of the amorphous silicon or similar type are ideal because the "vertical" coverage of structures (9) is then good or even perfect because of the inherent characteristics of the traditional processes for depositing such materials, especially using Chemical Vapour Deposition (CVD) or similar processes. In fact, it is possible to obtain a relatively constant thickness from the top to the bottom of vertical parts (9) as shown in FIG. 11. As a result, not only is thermal resistance optimised to an extremely low value, electrical noise in the compensation structures is sharply improved for a constant projected area, as explained previously.

Applying the invention to use other materials the deposition processes of which do not have these advantageous characteristics or which have them to a limited extent is dealt with, in example, by an alternative that is explained below.

As already mentioned, the design of parts (9) determines the electrical resistance value Rc seen between the two electrodes (6) of the compensation element of the invention. This electrical resistance can be reduced, maintained or increased relative to the reference configuration depending on the number (pitch) and orientation of patterns (9). For grooves with a 4 µm pitch and a depth of 2 µm, for example, resistance Rc is 0.5 or 2 times the reference resistance of the compensation element shown in FIG. 8 for a constant projected area depending whether the grooves are parallel or at right angles to the current lines. At the same time, the low-frequency noise introduced by resistance Rc is reduced by 40% and this makes it possible to use an even smaller area of elements earmarked for compensation in order to obtain the same noise level on the compensated signal.

A sixth lithographic level is applied in order to define the contours of the suspended membranes, the constituent materials of which (8), (6) and (5) are etched using conventional techniques to expose the sacrificial layer. The configuration of parts (9) as shown in the middle and bottom area of FIG. 10 poses no particular difficulty.

In contrast, the configuration in the top area of said FIG. 8 requires etching down to the substrate in order to completely cut the deep parts of material (8) down to the substrate. This requirement imposes constraints on the characteristics of the etching process. It is possible to make the end of the grooves that define contacts (9) slightly within the limits of the sixth mask in order to avoid this problem.

Another approach is to extend the grooves intended to define contacts (9) beyond the limits of the sixth lithographic mask, typically by a distance comparable to the depth of the grooves (i.e. 1.5 to 2.5 µm). Both these options are represented by the broken-line circle in FIG. 11.

The configuration in the bottom part of FIG. 11 may be preferred to the extent that it is preferable for the ends of the grooves that define contacts (9) to encroach onto electrodes (6) by 1.5 to 2.5 µm so as to avoid local narrowing of electrical width W. These preferred detailed arrangements tend to limit the low-frequency noise of the compensation resistance and result in improved control of resistance Rc given the statistics of registering the various lithographic levels relative to each other.

The end of the production process involves eliminating the sacrificial layer using isotropic oxidising etching, e.g. oxygen plasma etching, techniques that are well known in microelectronics.

A rough estimate of the gain in thermal conductance of the compensation structure according to the invention can be made as follows. For an array-type detection device having a pixel or elementary detector pitch of 35 µm for example, i.e. an edge dimension of slightly less than 35 µm, it is apparent that the points on the membrane of the compensation element located along the vertical centreline shown by the broken line in FIGS. 8 and 9, these points "seeing" the highest thermal resistance because they are located at positions that are the furthest from parts (7), said parts (7) being regarded as isothermal with substrate (1), are approximately 15 µm away from said parts (7) according to the prior art whereas this distance can be reduced to 1 to 2 µm by the device according to the invention.

Thermal conductance is therefore improved by a factor of the order of 10. If one bears in mind that, according to the invention, a markedly smaller proportion of active material (8) is far away from substrate (1) because part of it is deposited directly in contact with the latter, it is possible to obtain an increase in thermal conductance equal to several dozen times that of known devices depending on the layout and density of parts (9).

If the characteristics of the process of depositing the sensitive material (8) make it difficult to achieve the configuration shown in FIG. 11, this being the case, for instance, when vanadium oxides (VOx) deposited by Physical Vapour Deposition (PVD) are used as the bolometric material, it is possible in a special embodiment to deposit, for example, a thermally conducting layer before or after depositing the sensitive material in the patterns or parts (9), i.e. after they have been formed. Because these materials are typically metallic, it may be necessary to insert a dielectric layer between this thermally conducting layer and the sensitive material. This layer (or layers) can be advantageously removed from the surface of the membrane by using traditional etching processes, at least over the surface area affected by the active structures so as not to increase the thermal mass and/or thermal conductance of the active bolometers that are produced at the same time. These layers may be retained on the compensation structures.

In another particular embodiment of the invention, parts (9) may be entirely filled with material. This may be the case, in particular, if the sensitive material (8) is deposited in liquid form by a coating process (organic substance or mineral material deposited by sol-gel process) so as to form posts or linear structures of small cross-sectional area that are substantially vertical consisting either uniquely of sensitive material (8) or of at least one thermally conducting material or an assembly of thermally conducting and dielectric materials or an assembly of thermally conducting, dielectric and sensitive materials (8). Advantageously, these materials are removed from or are not deposited on the structures that are sensitive to infrared illumination (the bolometers in the imaging array).

In this embodiment, typically only the thermal resistance of the compensation structures is reduced and low-frequency noise is not fundamentally modified. During operation the current lines are not modified or only slightly modified.

It is apparent that using the device according to the invention one can very advantageously use the configuration that the LETI calls "subtractive" by obtaining optically insensitive compensation structures whilst significantly reducing their electrical noise or surface area. This device may also be used in bridge configurations as a reference structure at the temperature of the substrate and generates little noise or limited noise and is insensitive to illumination.

The invention claimed is:

1. A device for detecting infrared radiation comprising:
a one or two-dimensional array of elementary bolometric detectors, that are electrically connected to a readout circuit; and
a compensation structure associated with said readout circuit to divert most of the background or common-mode current flowing through each of the bolometric detectors of the array,
wherein the compensation structure consists of a simple or complex layer comprising at least one bolometric material extending between two electrical connection areas linked to the readout circuit, and
wherein said layer incorporating the bolometric material that constitutes the compensation structure is itself in thermal contact with the substrate that constitutes the readout circuit outside the electrical connection areas.

2. A device for detecting infrared radiation as claimed in claim 1, wherein the bolometric material that constitutes the compensation structure is identical to the bolometric material that constitutes the bolometric material that ensures active detection and is part of the detection array.

3. A device for detecting infrared radiation as claimed in claim 1, wherein the compensation structure is located at the end of a row or the end of a column of the array of elementary detectors.

4. A device for detecting infrared radiation as claimed in claim 1, wherein the contacts between the layer that incorporates the bolometric material that constitutes the compensation structure and the substrate of the readout circuit have a linear configuration defined by corrugations of said layer in a vertical plane, the corrugations extending parallel to the electrical connection areas of said structures on the readout circuit, all or some of the lower ends of the corrugations being in thermal contact with substrate that constitutes the readout circuit.

5. A device for detecting infrared radiation as claimed in claim 1, wherein the contacts between the layer that incorporates the bolometric material that constitutes the compensation structure and substrate of the readout circuit have a linear configuration defined by corrugations of said bolometric material in a vertical plane, said corrugations extending at a right angle to electrical connection areas of said structures on readout circuit, all or some of the lower ends of the corrugations being in thermal contact with substrate that constitutes the readout circuit.

6. A device for detecting infrared radiation as claimed in claim 1, wherein the contacts between the layer that incorporates the bolometric material that constitutes the compensation structure and substrate of the readout circuit have a point-shaped configuration defined by posts or pits at the lower level of which said layer is in contact with substrate.

7. A device for detecting infrared radiation as claimed in claim 4, wherein the depressed areas defined by the corrugations or the pits in the layer that incorporates the bolometric material are topped by a bolometric material, by a thermally conducting material, by an assembly of thermally conducting and dielectric materials or by an assembly of thermally conducting, dielectric and bolometric materials.

* * * * *

UNITED STATES PATENT AND TRADEMARK OFFICE
CERTIFICATE OF CORRECTION

PATENT NO. : 7,288,765 B2  
APPLICATION NO. : 11/191760  
DATED : October 30, 2007  
INVENTOR(S) : Michel Vilain Page 1 of 1

It is certified that error appears in the above-identified patent and that said Letters Patent is hereby corrected as shown below:

*Title page* item 30: please add

Foreign Priority

FR    04.09847 ............... Sept. 16, 2004

Signed and Sealed this

Sixth Day of May, 2008

JON W. DUDAS  
*Director of the United States Patent and Trademark Office*